3,598,827
PREPARATION OF MONOMERIC OR DIMERIC
IMINES AND PYRROLES
John Charles Leffingwell, Winston-Salem, N.C., assignor to R. J. Reynolds Tobacco Company, Winston-Salem, N.C.
No Drawing. Continuation-in-part of application Ser. No. 595,003, Nov. 17, 1966. This application Apr. 7, 1969, Ser. No. 814,170
Int. Cl. C07d 27/26; C07c 119/00
U.S. Cl. 260—288    3 Claims

ABSTRACT OF THE DISCLOSURE

Treatment with manganese dioxide of organo primary amines having at least one hydrogen atom in alpha position to the amino group.

This application is a continuation-in-part of my copending application, Ser. No. 595,003, filed Nov. 17, 1966.

This invention relates to the synthesis of organic compounds and more particularly to a novel synthesis of organic compounds by treating organo primary amines with manganese dioxide.

In general, the present invention relates to the discovery that monomeric or dimeric imines (Schiff bases) and pyrroles can be readily obtained by reacting manganese dioxide with organo primary amines having at least one hydrogen atom alpha to the amino group. As is known, organic chemicals commonly designated Schiff bases are organic compounds possessing the characteristic divalent imino group R=NR. These materials are used widely as intermediates in organic synthesis, such as for the synthesis of aldehydes, dialdehydes, ketones, diketones, acids, diacids, anhydrides, pyrrolidines, etc. The Schiff bases, which are also useful as accelerators in vulcanization and as dyes, are usually prepared by condensation of an aldehyde or ketone with a primary amine.

It is a principal object of this invention to provide a new method of synthesizing monomeric and dimeric Schiff bases.

It is a further object of this invention to provide a new method for preparing substituted pyrroles which, among other uses, can be advantageously employed for synthesis of N-alkylpyrrolidines. Such pyrroles may also be employed as intermediates in the preparation of pyrrole dyes.

In accordance with the present invention it has now been found that Schiff bases or pyrroles can be prepared directly from organo or hydrocarbyl-substituted primary amines having at least one hydrogen atom in alpha position to the amino group using manganese dioxide. In general, the synthesis method of the present invention involves maintaining a hydrocarbyl-substituted primary amines in the presence of manganese dioxide for a period sufficient to permit the desired reaction to proceed. Contacting of the primary amines with manganese dioxide can be accomplished in any convenient manner. For example, the primary amine and manganese dioxide can be slurried together or the primary amine may be passed through a bed of the manganese dioxide such as by refluxing the same. The reaction with manganese dioxide can be carried out at a temperature ranging from ambient temperature to 170° C. or higher. However, it is usually preferred to conduct the reaction at an elevated temperature ranging from about 15 to 130° C. and in an inert atmosphere. It is also preferred to carry out the reaction in the presence of an inert solvent such as hexane, dioxane, pentane, tetrahydrofuran, benzene, pyridine, tertiary butanol, methylene chloride, chloroform and the like. When employing temperatures ranging from ambient to 170° C. the desired reaction is generally completed in a period ranging from about 1 to about 64 hours.

At the end of the reaction period the liquid reaction product is separated from the insoluble manganese oxides by filtration and the solvent, if one is employed, as well as any unreacted amine, can be removed by distillation at reduced pressure. Any amide compounds formed as by-products in the reaction can be isolated at this point by the addition of pentane and triturating until the solid amide precipitates. The pentane can be removed by distillation under reduced pressure and fractional distillation of the remaining oily residue yields the desired Schiff bases or pyrroles.

The synthesis method of this invention has wide applicability and is generally applicable to production of monomeric or dimeric Schiff bases or substituted pyrroles from hydrocarbyl-substituted primary amines containing at least one hydrogen atom in alpha position to the amino group. The hydrocarbyl group (R′ and R″ groups in the formulae below) present in the starting amine is one composed principally of hydrocarbon atoms and can be, for example, alkyl, cycloalkyl, alkenyl, cycloalkenyl, alkynyl, aryl, heteroaryl, alkaryl, aralyl or heteroaralkyl and

can be an alicyclic radical. Each of the hydrocarbon radicals can be with or without additional substituents such as halogen, alkoxy, nitro and the like. Thus, representative amines which can be employed according to the invention are ethylamine,
pyropylamine,
butylamine,
isobutylamine,
n-pentylamine,
isopentylamine,
2-methylbutylamine,
2-methylpentylamine,
2-methylhexylamine,
n-octylamine,
n-decylamine,
n-dodecylamine,
cyclohexylamine,
cyclopentylamine,
4-hexenylamine,
4-phenylhexylamine,
benzylamine,
p-methoxybenzylamine,
p-nitrobenzylamine,
p-bromobenzylamine,
3-picolylamine,
furfurylamine,
2-aminomethylthiophene,
4-(cyclohexyl)butylamine,
1,11-undecanediamine,
3-isopropoxypropylamine,
isopropylamine,
n-octadecylamine,
1-(3-ethylpentyl)-4-ethyloctylamine,
α-undecyldodecylamine,
5-nitropentylamine,
5-bromopentylamine,
1-isobutyl-3-methylbutylamine,
α-(3-phenylpropyl)phenethylamine,
α-tolylphenethylamine,
1,2-diphenylethylamine,
α-methylbenzylamine,
α-benzylthenylamine,
α-ethylfurfurylamine, α-ethylthenylamine,
α-cyclopropylbenzylamine,
α-cyclohexylphenethylamine,
cyclopropanemethylamine,
α-ethylcyclopentanemethylamine,
1,3-dimethylcyclopentanemethylamine,
1-phenyl-2-ethylcyclohexanemethylamine,
2-phenoxycyclohexanemethylamine,
cycloheptanemethylamine,
α-methyltetrahydrofurfurylamine,
tetrahydrothenylamine,
α-benzylnorbornenemethylamine,
allylamine,
α-methylallylamine,
4,4-dimethyl-2-methylenepentylamine,
1,5,9-trimethyl-8-decenylamine,
octadecenylamine,
1-propyl-3-butenylamine,
2-butynylamine,
4-chloro-2-butynylamine,
1-ethynylbutylamine,
4-chlorobenzylamine,
2,4-dichlorobenzylamine,
1-naphthalenemethylamine,
α-hexyl-1-naphthalenemethylamine,
2-methyl-1-naphthalenemethylamine,
1-nitro-2-naphthalenemethylamine,
4-cyclohexyloxybenzylamine,
p-(p-nitrophenyl)benzylamine,
1,1-diphenylmethylamine,
5-chlorofurfurylamine,
5-chloro-2-thenylamine,
5-bromofurfurylamine,
α-ethyl-5-nitro-2-thenylamine,
α-phenyl-2-thenylamine,
3-(aminomethyl)-2,4,5-triphenylpyrrole,
2-(aminomethyl)indole,
3-(1-aminobutyl)pyridine,
3-(aminomethyl)-4-methyl-5-phenylpyridine,
p-pentylbenzylamine,
8-(aminomethyl)-6-methoxyquinoline,
naphthalenepentylamine,
4-(2-aminoethyl)-1-methylimidazole,
1-(3-aminopropyl)pyrrole,
2-(2-aminoethyl)-1-methylpyrrole,
3-(3-aminopropyl)quinoline,
5-methyltryptamine,
5-methoxytryptamine,
cyclopropylamine,
2-phenylcyclopropylamine,
2-phenylcyclopentylamine,
2-aminoindan,
4-cycloocten-1-ylamine,
cyclododecylamine,
α-methylcyclopentaneëthylamine,
1-phenylcyclopentanemethylamine,
α-methyl-1-cyclopentene-1-ethylamine,
1-cycloheptene-1-ethylamine,
norbornaneëthylamine,
p-benzylphenethylamine,
α-benzylphenethylamine,
α-(o-chlorophenethyl)benzylamine,
veratrylamine,
3,3-diphenylpropylamine,
1,2,2-triphenylethylamine,
1,5-diphenylpentylamine,
furanbutylamine,
2,2-di-p-tolylethylamine,
cyclopenteneëthylamine,
p-bromophenethylamine,
α-(p-chlorophenyl)phenethylamine,
2-dodecyl-4,5-dimethoxyphenethylamine,
α-methyl-p-nitrophenethylamine,
5-indaneëthylamine,
mescaline,
7-methoxy-2-naphthaleneëthylamine,
1,4-diphenyl-2-naphthaleneëthylamine,
3-hexamethyleneimino-1-propylamine,
1-(3-aminopropyl)-2-pyrrolidinone,
α-hexylbenzylamine,
α-ethyltryptamine,
3-(3-aminopropyl)indole,
β-(2-pyridyl)-1-naphthtaleneëthylamine and the like.

The general reactions involved in the synthesis of the present invention can be illustrated by the following equations:

I

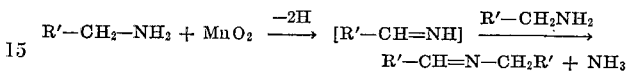

II

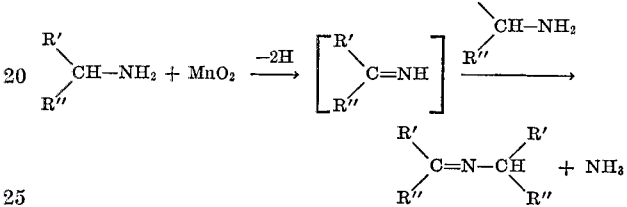

When R′ and R″ in Equation I or II are aryl radicals and the carbon atom in the beta position to the amino group is not saturated or bears no hydrogen atoms, monomeric imines of the structure shown are obtained in all cases. Similarly, when R′ and R″ in Equation I or II are alkyl radicals and when mild reaction conditions are employed, monomeric imines are obtained even though the carbon atom in the beta position to the amino group is saturated and/or bears 1 or 2 hydrogen atoms. By mild reaction conditions it is meant conditions which will cause initial dehydrogenation of a primary amine bearing at least a single hydrogen on the alpha carbon atom to an imine; it will be appreciated that such conditions may vary somewhat depending on the relative reactivity of the individual amine, but usually agitation at temperatures ranging from ambient to 100° C. over a period ranging from 1 to 48 hours and employing from 1 to 3 molar equivalents of manganese dioxide per mole of amine is sufficient.

However, when more severe reaction conditions are employed, the monomeric imines prepared as in Equation I or II in which the carbon atom beta to the amino group is saturated and with a single hydrogen and a hydrocarbyl group attached thereto, undergo oxidative coupling to dimeric Schiff bases. Such reaction is illustrated in Equation III.

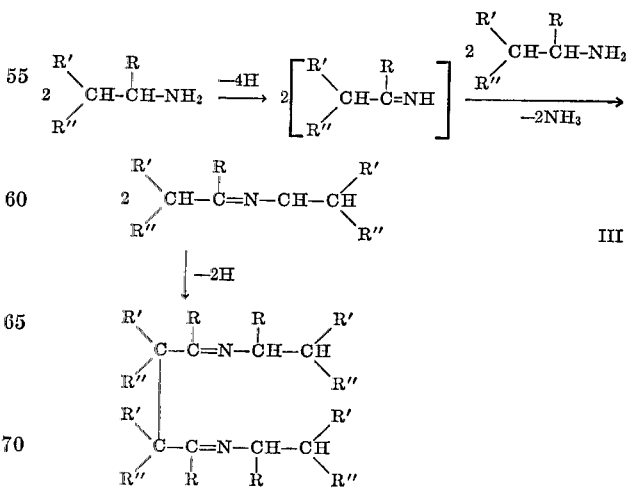

With acyclic amines as reactant and with use of relatively more severe reaction conditions, the monomeric imines as prepared in Equation I or II which bear a saturated carbon atom with two hydrogen atoms beta to the original amino group undergo oxidative coupling to give pyrroles. This reaction is illustrated in Equation IV.

IV

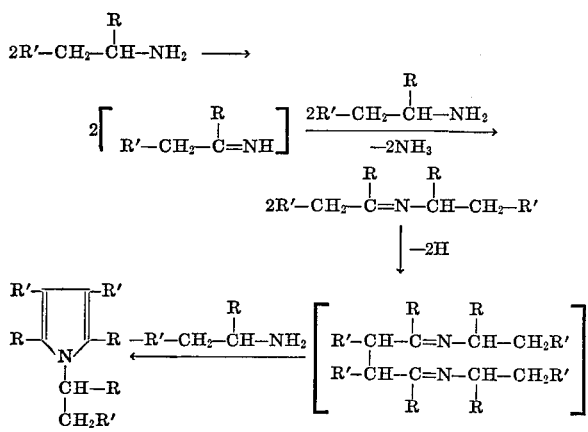

Generally to accomplish the reactions illustrated in Equations III and IV relatively more severe reaction conditions are employed than are necessary for accomplishing the reactions illustrated in Equations I and II. Throughout this application more severe reaction conditions means relatively longer reaction times, higher temperatures and a higher mole ratio of manganese dioxide than is required for the initial monomeric Schiff base formation. Thus, more severe reaction conditions can be considered as extended reaction times of say from 4 to 64 hours, temperatures say from 60 to 170° C. and a substantial excess of manganese dioxide, say from 2 to 10 moles per mole of amine.

It will be appreciated that the reaction conditions are relative. One skilled in the art may choose reaction conditions which will favor the production of monomeric Schiff bases or the corresponding coupling products (dimeric imines or pyrroles). The resultant products are dependent to great extent on the relative kinetic rates of formation of the various products. For example, with isobutylamine appreciable amounts of the oxidative coupling product are obtained even with the use of relatively mild reaction conditions employed for the initial monomeric imine formation. In short, there is no absolute demarcation between the terms mild and severe reaction conditions since conditions which are sufficiently severe to cause coupling in one case (e.g. isobutylamine) may be sufficiently mild to cause monomeric Schiff base formation in another case (e.g. n-dodecylamine). In the practice of this invention those skilled in the art can be expected to employ reaction conditions which favor the reaction desired.

In the above equations R may be hydrogen or a hydrocarbyl group such as alkyl, cycloalkyl, aryl, heteroaryl and aralkyl. Each of the hydrocarbon radicals can be with or without additional substituents such as halogen, alkoxy, nitro and the like.

It will be seen that the synthesis of the invention is quite flexible. Depending upon the objective, various types of end products can be obtained in a simple and convenient manner. The type of end product which is desired will, of course, govern the selection of primary amine reactant as well as the reaction conditions employed in the synthesis. Thus, as illustrated in Equation I, when there is employed as reactant a primary amine having two hydrogen atoms on the carbon atom alpha to the amino group an aldimine product is obtained whereas as illustrated in Equation II with a primary amine having only one hydrogen atom in alpha position to the amino group a ketimine product is obtained. Again, as illustrated in Equation III, with an amine having a saturated carbon atom beta to the amino group with an alkyl or aryl and a hydrogen thereon, a dimeric imine product can be obtained by using relatively more severe reaction conditions than would be required simply for the initial monomeric Schiff base formation. Moreover, as illustrated in Equation IV, with an acyclic primary amine having a saturated carbon atom with two hydrogen atoms beta to the original amino group a substituted pyrrole can be obtained as product by using relatively more severe reaction conditions than would be required simply for the initial monomeric Schiff base formation.

Anhydrous or activated (hydrated) manganese dioxide as well as certain commercial manganese dioxide ores commonly employed in organic synthesis can be employed in the synthesis of the invention. The amount of manganese dioxide to employ depends upon various factors such as the reaction temperature, reaction time, type of primary amine employed as a reactant, the desired conversion rate, the end products desired and so forth. An excess of manganese dioxide favors the production of dimeric Schiff bases or pyrroles when certain primary amines, as indicated, are employed as a reactant.

The following specific examples illustrate in detail the synthesis of the present invention.

EXAMPLE 1

Reaction of benzylamine with manganese dioxide to give N-benzylidenebenzylamine

In a round bottom flask, equipped with a stirrer and reflux condenser connected to a gas inlet-outlet valve, were placed 45 grams of activated manganese dioxide, 200 milliliters of purified dioxane and 23 grams of benzylamine. This mixture was then stirred at reflux temperature (100° C.)[1] for 48 hours. A slight positive nitrogen pressure was maintained in the reaction vessel during reaction by means of a gaseous nitrogen filled balloon connected to the gas inlet valve attached to the condenser outlet. The reaction mixture was cooled to ambient temperature and the solid manganese oxides removed by filtration. The manganese oxides were washed with several portions of dioxane and the filtrates combined. The solvents were removed from the combined filtrate under reduced pressure to give 19.4 grams of a yellow oil which on cooling afforded large needle-like crystals of benzamide. The oil-crystal mixture was diluted with hexane and the crystalline amide (1.62 g.) was removed by filtration. The sample of benzamide obtained was identified by its melting point, 129.5–130.2° C., and infrared spectrum as compared to known sample. The hexane was removed from the filtrate under reduced pressure to give 17.7 grams of a yellow oil. Fractional distillation of the oil portion over a 4-inch vigreaux column yield 1.5 grams of a mixture of 2 parts benzaldehyde and 1 part benzonitrile, boiling point 51–55° C. (5 mm.), identified by vapor-phase chromatography retention times and the infrared spectra compared to known samples. The major fraction (14.9 g.), boiling point 130–145° C. (0.4 mm.), was identified as substantially pure N-benzylidenebenzylamine by vapor-phase chromotography and its infrared spectrum as compared to a known sample prepared from benzaldehyde and benzylamine. This sample illustrates the reaction of a primary amine having no hydrogen atoms beta to the amino group to form an aldimine. The equation (corresponding to Equation I) for this reaction can be illustrated as follows:

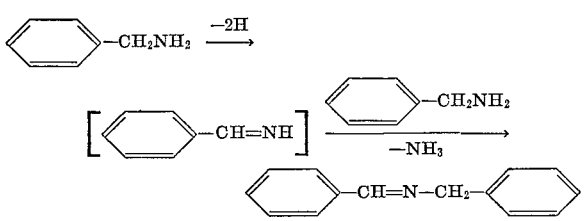

---

[1] See footnote at bottom of column 9.

EXAMPLE 2

Reaction of p-methoxybenzylamine with maganese dioxide to give N-(4-methoxybenzyliden)-benzylamine The process of Example 1 was repeated to prepare a similar reflux mixture (100° C.)[1] except that 15 grams of p-methoxybenzylamine and 25 grams of activated manganese dioxide was employed instead of 23 grams of benzylamine and 45 grams of manganese dioxide. The resulting product mixture yielded 1.21 grams of p-anisamide, melting point 169° C., and 11.9 grams of crude oil which was distilled. Fractional distillation under reduced pressure gave 1.8 grams of a mixture of 1 part p-methoxybenzonitrile and 3 parts p-methoxybenzaldehyde, boiling point 67–72° C. (2.5 mm.) identified by separating the components by preparative vapor-phase chromatography and comparison of the infrared spectra with those of known samples. The fraction (5.7 g.) distilling mainly at 195–205° C. (2.5 mm.) was identified as N-(4-methoxybenzylidene)-4-methoxybenzylamine by its infrared spectrum (which showed a strong imine absorption at 6.09μ) and its nuclear magnetic resonance spectrum. The latter was distinguished by the methoxyl ($CH_3O$—) absorption centered at 6.25τ, the methylene adjacent to both the aryl and imine nitrogen

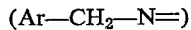

absorption at 5.32τ, the aldimine proton absorption (—N—CH—) at 1.75τ and the aromatic proton absorptions at 2.2–3.22τ.

This example is also illustrative of the reaction illustrated in Equation I.

EXAMPLE 3

The general procedure of Examples 1 and 2 is followed to prepare aldimines using as the starting primary amine p-nitrobenzylamine or p-bromobenzylamine or m-methoxybenzylamine and like amines.

EXAMPLE 4

Reaction of dodecylamine with manganese dioxide to give N-dodecylidenedodecylamine The process of Example 1 was repeated to prepare a similar reflux mixture (100° C.)[1] except that 41.5 grams of dodecylamine were employed instead of 23 grams of benzylamine. The resulting product mixture afforded 0.62 gram of lauramide, melting point 96–97° C., and 32.1 grams of a dark crude oil, a portion of which was distilled. Fractional distillation of a 25 gram portion of the oil afforded 11.7 grams of unreacted dodecylamine, boiling point 87–93° C. (1 mm.) an 11.0 grams of N-dodecylidenedodecylamine, boiling point 166–174° C. (1 m.). The N-dodecylidenedodecylamine was identified by the strong imine (—CH=N—) absorption at 5.97μ in its infrared spectrum and its mass spectrum which showed the molecular ion at m/e 351 as expected. This example is illustrative of the reaction of Equation I with an alkyl primary amine having hydrogen atoms beta to the amino group to yield an aldimine product. This reaction can be illustrated as follows:

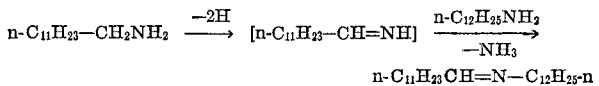

EXAMPLE 5

The procedure of Example 4 can be modified by using shorter reaction times and/or lower boiling inert solvents to prepare aldimines using as the starting primary amine n-butylamine or n-pentylamine or isopentylamine or hexylamine or octylamine or decylamine and the like.

[1] See footnote at bottom of column 9.

EXAMPLE 6

Reaction of isobutylamine with manganese dioxide to give N,N'-diisobutyl-2,2,3,3-tetramethylsuccinaldimine The process of Example 1 was repeated to prepare a similar reflux mixture (100° C.) [1] except that 16.5 grams of isobutylamine were employed instead of 23 grams of benzylamine. The resultant product mixture afforded 0.20 gram of isobutyramide, melting point 128–130° C., and 6.35 grams of a light yellow orange oil which was distilled under reduced pressure over a 4-inch vigreaux column. The fraction (0.91 g.), boiling point 40–45° C. (11 mm.) consisted of a mixture of dioxane and N-isobutylidene-isobutylamine, the components being identified by comparison of vapor-phase chromatography retention times with known samples. The fraction (4.86 g.) boiling mainly at 125–129° C. (11 mm.) was identified as substantially pure N,N'-diisobutyl-2,2,3,3-tetramethylsuccinaldimine on the basis of spectral analysis: its infrared spectrum showed strong absorptions at 6.00, 6.82, 7.24, 7.33, 7.45, 7.76, 8.77, 9.71 and 10.54 (microns); the nuclear magnetic resonance spectrum was very characteristic, showing two gem-dimethyl groups at 9.0τ (singlet), 4 methyl groups on isopropyl linkages (—$CH(CH_3)_2$) as doublets at 9.15τ, 2 aldimine protons (—CH=N—) at 2.66τ and four protons adjacent to the imine nitrogen and isopropyl groups (=N—$CH_2$—CH) as a doublet at 6.95τ; the mass spectrum indicated a molecular ion at m/e 252. This reaction is illustrated as follows:

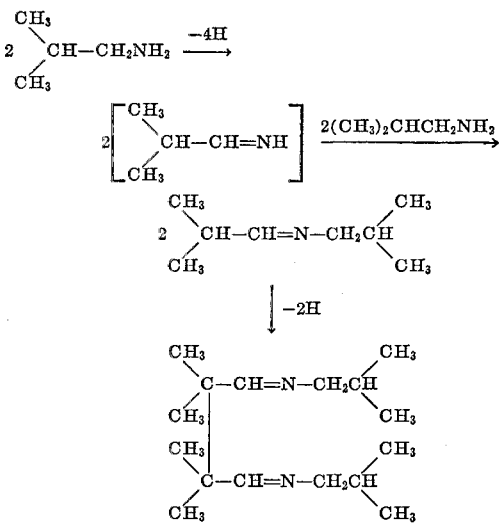

EXAMPLE 7

The procedure of Example 6 is followed using as the starting primary amine 2-methylbutylamine, 2-methylpentylamine, 2-ethylbutylamine, 2-ethylpentylamine, 2-ethylhexylamine, 2-methylhexylamine, 2-phenylbutylamine, 2-phenylpropylamine, 2,2-diphenylethylamine and the like.

EXAMPLE 8

Reaction of n-butylamine with manganese dioxide to give 1-n-butyl-3,4-diethylpyrrole The process of Example 1 was repeated to prepare a similar reflux mixture except that 35 grams of n-butylamine, 50 grams of manganese dioxide and 150 cubic centimeters of dioxane were employed. The resultant product mixture afforded 12.5 grams of a crude dark oil and 19 grams of recovered n-butylamine. Fractional distillation afforded a fraction (4.71 g.) boiling point 65–80° C. (0.05 mm.), identified as a mixture of N-(2-ethyl-2-hexenylidene) - butylamine, 1-n-butyl-3,4-diethylpyrrole and an unknown component of molecular weight 179.

[1] See footnote at bottom of column 9.

The N-(2-ethyl-2-hexenylidene)-butylamine, which comprised 26% of this fraction, was isolated by vapor-phase chromatography and identified by its characteristic spectra: the infrared spectrum gave absorptions at 6.05μ and 6.10μ corresponding to an α,β-unsaturated imine; the nuclear magnetic resonance spectrum showed absorptions centered at 9.0τ corresponding to saturated methyls and methylenes; allylic methylenes absorbed at 7.67τ; the methylene adjacent to the nitrogen (=N—CH₂—CH₂—)

appeared as a triplet at 6.50τ; an olefinic proton (—C=CH—) appeared at 4.20τ and an aldimine proton at 2.20τ; the nuclear magnetic resonance spectrum integrated correctly; the mass spectrum afforded a molecular ion at m/e 181.

The 1-n-butyl-3,4-diethylpyrrole, which comprised 33% of the fraction, was isolated by vapor-phase chromatography and identified by its spectral characteristics: the infrared spectrum gave absorptions at 6.5μ, 8.64μ and 13.0μ characteristic of 1,3,4-trialkylpyrroles; the nuclear magnetic resonance spectrum showed methyl absorptions centered at 8.87τ; the methylene protons alpha to the pyrrole ring appeared as a quartet at 7.60τ; the N—CH₂— protons absorbed as a triplet at 6.27τ and the protons on the 2- and 5-positions of the pyrrole ring were present at 3.75τ (singlet); the nuclear magnetic resonance spectrum integrated correctly; the mass spectrum afforded a molecular ion at m/e 179. This example illustrates the reaction of Equation IV using an acyclic primary amine having a saturated carbon atom with two hydrogen atoms beta to the amino group to yield a pyrrole compound. The reaction is illustrated as follows:

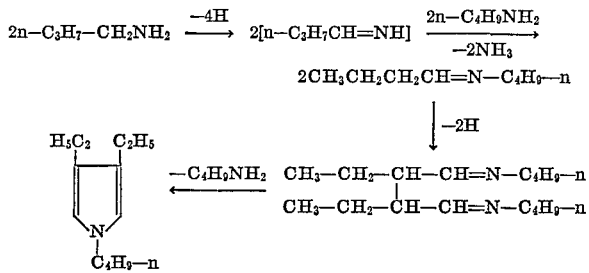

In similar reaction runs, the monomeric Schiff base, N-butylidene-n-butylamine, has been isolated in yields of 10–15%.

EXAMPLE 9

The procedure of Example 8 or a modification thereof employing a larger excess of MnO₂ with higher temperatures and longer reaction times can be followed to obtain pyrrole compounds using as the starting primary amine propylamine or pentylamine or hexylamine or 3-methylbutylamine or 3-methylhexylamine or 3-methoxypropylamine or 1-amino-4-phenylbutane and like amines.

EXAMPLE 10

The reaction of cyclohexylamine with manganese dioxide to give N-cyclohexylidenecyclohexylamine The process of Example 1 was repeated to prepare a similar reflux mixture (100° C.)[1] except that 22 grams of cyclohexylamine were employed instead of 23 grams of benzylamine. The resultant product mixture afforded 10.4 grams of recovered cyclohexylamine and 9.4 grams of a crude orange-brown oil, a portion of which (5.0 g.) was distilled under reduced pressure to afford a fraction (1.1 g.), boiling point 69–75° C. (0.5–1.0 mm.), identified as N-cyclohexylidenecyclohexylamine from its infrared spectrum as compared to a known sample preperature from about 15° to 170° C. an organo primary fraction afforded a molecular ion, m/e 179, in the mass spectrum as expected. This example illustrates the reaction of Equation II using a primary amine having one hydrogen atom on the carbon atom beta to the amino group. The reaction is illustrated as follows:

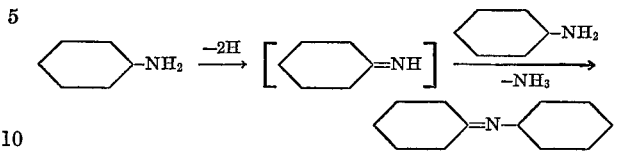

EXAMPLE 11

The procedure of Example 10 is followed using as the starting primary amine chyclopentylamine or cycloheptylamine or aminodiphenylmethane and like amines.

It will be evident from the foregoing that the present invention provides a novel and simple method for synthesizing imines and substitute pyrroles from primary amines.

Those modifications and equivalents which fall within the spirit of the invention are to be considered a part thereof.

I claim:

1. A process which comprises contacting at a temperature from 15° to 170° C. an organo primary amine amine having the structure

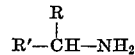

wherein R=H, alkyl of 1 to 17 carbon atoms, cycloalkyl of 3 to 10 carbon atoms, alkenyl of 2 to 10 carbon atoms, alkaryl of 7 to 17 carbon atoms, aralkyl of 7 to 17 carbon atoms, phenyl, naphthyl, biphenylyl, pyridyl, furyl, thienyl, pyrryl, indolyl or quinolyl, R'=alkyl of 1 to 17 carbon atoms, cycloalkyl of 3 to 10 carbon atoms, alkenyl of 2 to 10 carbon atoms, alkaryl of 7 to 17 carbon atoms, aralkyl of 7 to 17 carbon atoms, phenyl, naphthyl, biphenylyl, pyridyl, furyl, thienyl, pyrryl, indolyl or quinolyl, and

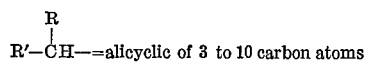

provided further that each of the above radicals can be with or without additional substituents selected from halogen, alkoxy and nitro with manganese dioxide to convert the organo primary amine to an imine compound, said contacting being effected for a time ranging from about 1 to 48 hours using about 1 to 3 moles of manganese dioxide per mole of organo primary amine to convert said amine to said imine compound.

2. A process which comprises contacting an organo primary amine having the structure

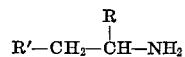

wherein R=H, alkyl of 1 to 17 carbon atoms, cycloalkyl of 3 to 10 carbon atoms, alkenyl of 2 to 10 carbon atoms, alkaryl of 7 to 17 carbon atoms, aralkyl of 7 to 17 carbon atoms, phenyl, naphthyl, biphenylyl, pyridyl, furyl, thienyl, pyrryl, indolyl or quinolyl, and R'=alkyl of 1 to 16 carbon atoms, cycloalkyl of 3 to 10 carbon atoms, alkenyl of 2 to 9 carbon atoms, alkaryl of 7 to 17 carbon atoms, aralkyl of 7 to 16 carbon atoms, phenyl, naphthyl, biphenylyl, pyridyl, furyl, thienyl, pyrryl, indolyl or quinolyl, provided further that each of the above radicals can be with or without additional substituents selected from halogen, alkoxy and nitro with manganese dioxide to convert the organo primary amine to a pyrrole compound, said contacting being effected at a temperature in the range from about 60° to 170° C. and for a time ranging from about 4 to 64 hours using about 2 to 10 moles of manganese dioxide per mole of organo primary amine to convert the amine to a pyrrole compound.

---

[1] In the above example the reflux temperature was approximately 100° C. plus or minus 10° C.

3. A process which comprises treating an organo primary amine having the structure $$R''-\underset{\underset{R'}{|}}{CH}-\underset{\underset{R}{|}}{CH}-NH_2$$

wherein R=H, alkyl of 1 to 17 carbon atoms, cycloalkyl of 3 to 10 carbon atoms, alkenyl of 2 to 10 carbon atoms, alkaryl of 7 to 17 carbon atoms, aralkyl of 7 to 17 carbon atoms, phenyl, naphthyl, biphenylyl, pyridyl, furyl, thienyl, pyrryl, indolyl or quinolyl,
R',R''=alkyl of 1 to 16 carbon atoms, cycloalkyl of 3 to 10 carbon atoms, alkenyl of 2 to 9 carbon atoms, alkaryl of 7 to 17 carbon atoms, aralkyl of 7 to 16 carbon atoms, phenyl, naphthyl, biphenylyl, pyridyl, furyl, thienyl, pyrryl, indolyl or quinolyl,
provided further that each of the above radicals can be with or without additional substituents selected from halogen, alkoxy and nitro with manganese dioxide to convert the organo primary amine to a dimeric imine compound, said contacting being effected at a temperature in the range from about 60° to 170° C. and for a time ranging from about 4 to 64 hours using about 2 to 10 moles of manganese dioxide per mole of organo primary amine to convert the amine to a dimeric imine compound.

References Cited
UNITED STATES PATENTS 2,421,937   6/1947   Haury _____ 260—566

ALEX MAZEL, Primary Examiner

J. A. NARCAVAGE, Assistant Examiner

U.S. Cl. X.R.

260—296R, 313.1, 326.15, 326.9, 329AM, 347.7, 566R

UNITED STATES PATENT OFFICE
CERTIFICATE OF CORRECTION

Patent No. 3,598,827           Dated August 10, 1971

Inventor(s) John Charles Leffingwell

It is certified that error appears in the above-identified patent and that said Letters Patent are hereby corrected as shown below:

Column 1, line 55, "amines" should be -- amine --

Column 2, line 35, "pyropylamine" should be -- propylamine --

Column 4, line 8, "naphthtaleneethylamine" should be

-- naphthaleneethylamine --

Column 7, line 52, "an" should be -- and -- line 54, "m.)" should be -- mm.) --

Column 9, line 72, delete "perature from about 15° to 170° C.

an organo primary" and in lieu thereof insert --pared from cyclohexylamine and cyclohexanone. This-- line 75, "example" should be -- examples --

Column 10, line 14, "chyclopentylamine" should be

-- cyclopentylamine -- line 25, cancel "amine"

Signed and sealed this 18th day of January 1972.

(SEAL)
Attest:

EDWARD M. FLETCHER, JR.      ROBERT GOTTSCHALK
Attesting Officer             Acting Commissioner of Patents